United States Patent [19]

Maiville et al.

[11] Patent Number: 5,067,752
[45] Date of Patent: Nov. 26, 1991

[54] DRY BREAK COUPLING

[75] Inventors: Randolph L. Maiville, Onondaga; Russell L. Rogers, Munith, both of Mich.

[73] Assignee: Aeroquip Corporation, Jackson, Mich.

[21] Appl. No.: 619,374

[22] Filed: Nov. 28, 1990

[51] Int. Cl.⁵ .......................... F16L 55/00
[52] U.S. Cl. .................... 285/119; 200/339; 200/430
[58] Field of Search ............... 285/119; 200/291, 339, 200/430

Primary Examiner—John C. Fox
Attorney, Agent, or Firm—Ralph J. Skinkiss; Duncan F. Beaman

[57] ABSTRACT

A low flow resistant dry break fluid coupling suitable for military and industrial refueling applications wherein the coupling is connected to a male adapter by radially displaceable detents operated by an axially movable locking sleeve. The coupling including a valve having a manual actuating handle which includes locking sleeve interference structure preventing the locking sleeve from being displaced to the adapter release position while the valve is in the open position. Additionally, electric switch structure mounted upon the coupling body permits gloved actuation to control a fluid pump.

6 Claims, 7 Drawing Sheets

DRY BREAK COUPLING

BACKGROUND OF THE INVENTION

Valved fluid couplings are utilized to control fluid flow circuits having coupling components which may be readily separated. Such couplings are often used in refueling systems for military and industrial applications and valved couplings are known having valve components automatically operated by interconnection of the coupling parts. If low fluid flow pressure loss and high flow rate is of importance valved couplings may utilize ball valves rotatable between fully open and closed positions by a 90° rotation of the ball valve. The ball valve operation may be manually controlled, or automatically regulated as operated by springs or the like. Examples of ball valve couplings are shown in the assignee's U.S. Pat. Nos. 4,643,216 and 4,884,591. It is also known to provide ball valve couplings operated by manual handles with interlocking structure whereby the valves cannot be inadvertently opened or closed until the coupling parts are properly connected or disconnected, and an example of such ball valve couplings are shown in the assignee's U.S. Pat. No. 4,438,779.

When interconnecting coupling parts with an axial movement between the parts it is well known to utilize radially movable detents in the female coupling connection end for being received within an annular groove defined in the male coupling adapter. Such detents are radially positionable and maintainable by an axially displaceable locking sleeve mounted upon the female coupling part, and a cam surface and a retaining surface formed on the locking sleeve locates the detents in the desired radial position depending upon the axial location of the sleeve. Usually, a spring biases the locking sleeve toward the detent retaining or locking condition.

Heretofore, to the inventors' knowledge, a high flow rate coupling utilizing an axially displaceable locking sleeve has not been available wherein manual operation of the valve to rotate the valve from the open condition to the closed condition has been interlocked in conjunction with a sleeve operation, and it is an object of the invention to provide a low flow restrictive coupling having a manually operated valve wherein the coupling parts are interconnected by an axially displaceable locking sleeve and shifting of the locking sleeve from the coupling connection position to the release position is prevented until the coupling valve is closed.

Another object of the invention is to provide a high flow rate valved coupling of the "dry break" type wherein minimal loss of fluid occurs when the coupling parts are separated, and yet, the coupling parts are maintained in interconnection by an axially displaceable locking sleeve which may only be released when the valved coupling valve is closed.

A further object of the invention is to provide a dry break valved coupling of low fluid flow restriction and pressure loss in a coupling using an axially displaceable locking sleeve, and an interlock exists between the coupling valve operator and the locking sleeve preventing release of the locking sleeve until the valve operator is in the closed position.

A further object of the invention is to provide a dry break coupling having an electric switch mounted upon the exterior of the coupling body which is capable of gloved actuation and dependable operation to control the pump supplying the coupling with pressurized fluid.

In the practice of the invention the coupling female body part includes a passage having a ball valve rotatable therein between 90° positions. One position of the ball valve aligns the diametrical passage of the valve with the associated coupling passage permitting relatively unrestricted fluid flow therethrough, and the closed position of the valve locates the valve passage at right angles to the coupling passage to terminate fluid flow. Appropriate seals are interposed between the coupling body and ball valve to render the assembly fluid tight.

The female coupling part includes a male adapter receiving recess adjacent the ball valve, and radially displaceable detents mounted within the recess engage with an annular groove defined upon the male adapter under the control of an axially displaceable locking sleeve mounted upon the female coupling body.

The locking sleeve includes conical cam and cylindrical detent retaining surfaces and depending upon the axial position of the locking sleeve the detents will be selectively radially displaceable to permit interconnection and release of the adapter relative to the female coupling part, or the detents will be inwardly retained to prevent disconnection of the male adapter from the coupling part.

The ball valve is operated by an exterior handle located adjacent the female coupling part body, and the handle includes a pivotally mounted keeper adapted to selectively associate with notches defined on the coupling body wherein the valve handle may be positively maintained in a valve open or close position. The valve operating handle also includes a locking sleeve interference abutment surface substantially concentrically located relative to the handle operating axis of rotation, and the abutment is located in an interfering relationship with the locking sleeve when the valve is open preventing the locking sleeve from being axially displaced from the adapter locked position to the adapter release position until the valve handle has been fully rotated to the valve closed condition. The use of the actuating handle abutment prevents the adapter from being released from the female coupling part until flow through the coupling part has been terminated, and this interlock, in conjunction with the "dry break" characteristics derived from the use of a ball valve, eliminates the likelihood of spillage which has significant environmental and safety advantages, particularly when handling inflammable and/or toxic fluids.

An electric switch is mounted upon the exterior surface of the female coupling part between a pair of protective spaced flanges which reduce the likelihood of inadvertent switch actuation. The flanges are spaced sufficiently apart to permit a gloved thumb to pivot the switch handle between operative positions, and a spring contact mounted upon the switch handle selectively receives an enlarged head defined upon a terminal stud located on the female conduit body and extending into the body passage.

The switch contact is resilient enough to pass over the head of the terminal stud to locate and retain the switch in the circuit closed position, and the switch provides a positive movement between open and closed positions. An electrical conductor wire attached to the terminal stud may pass through the hose associated with the coupling to initiate pump operation, and the switch construction provides dependable electric circuit operation in a manner as to be positively sensed by the operator. A spring pivots the switch handle toward the normal open position and also defines the spring contact and the electrical connection between the spring contact and the coupling body to assure a grounding circuit.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
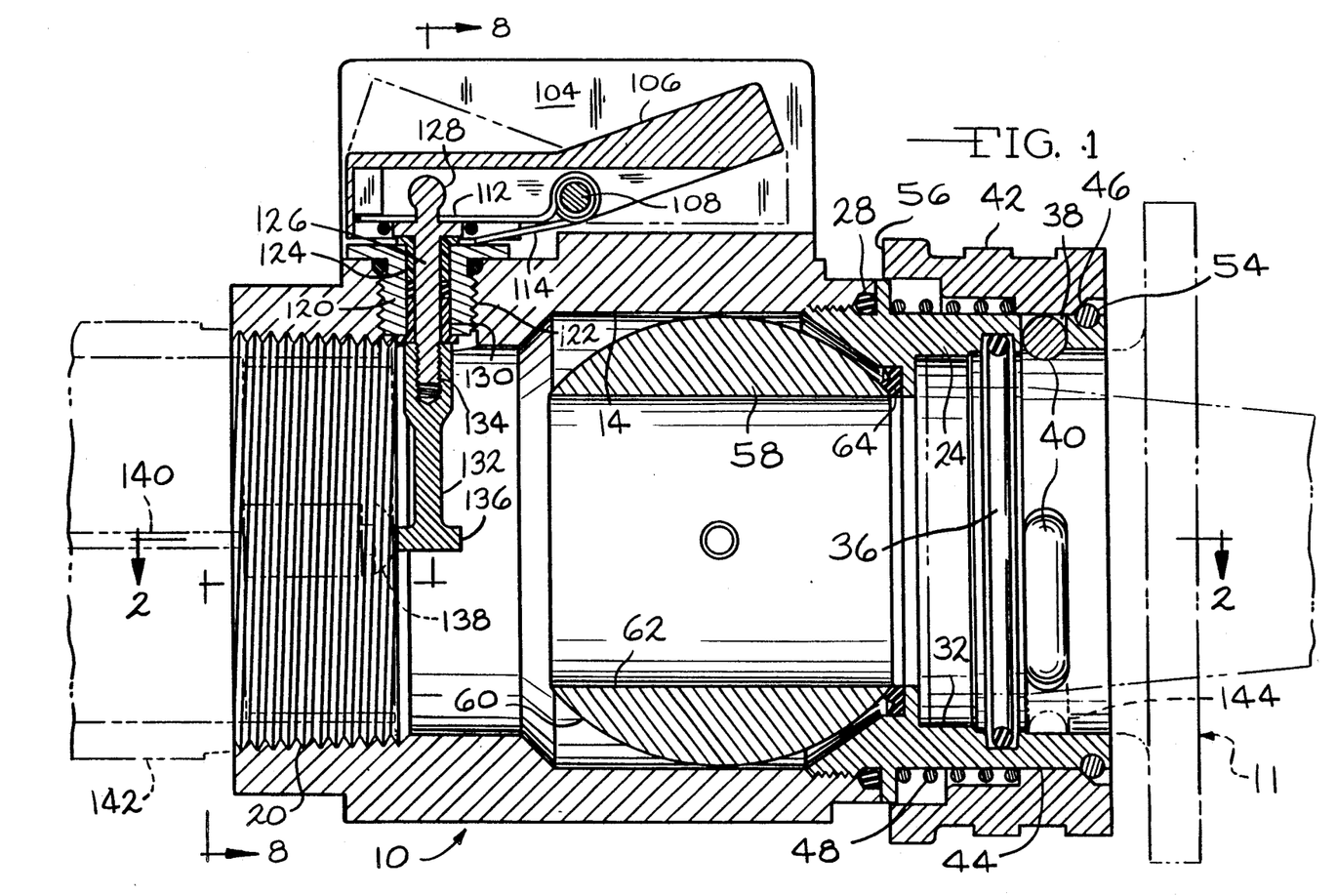
FIG. 1 is a diametrical elevational sectional view of a female coupling part in accord with the invention, the electric switch being shown in the closed condition, the valve being illustrated in the open condition, and a male adapter and hose fitting being shown in phantom lines.

A dry break coupling utilizing the inventive concepts is generally represented by numeral 10, and in its disclosed form the coupling 10 constitutes the female coupling part of a two-part assembly which includes the male adapter 11, shown in phantom lines in FIG. 1, which forms no part of the inventive concept.

The part 10 includes a generally elongated tubular body 12 having a passage 14 axially extending therethrough. The passage 14 intersects the male adapter receiving end 16 of the body 12, and the opposite end of the body constitutes the conduit connection end 18. The connection end 18 includes interior threads 20 whereby a flexible conduit, such as a hose, not shown, may include a fitting, as later described, which is threaded into the threads 20. The body 12 is provided with exterior flats 22 for receiving a wrench to aid in tightening the coupling part 10 upon the hose fitting.

A tubular adapter receiving sleeve 24 is mounted upon the male adapter receiving end 16 by internal threads 26, and is sealed to the body 12 by elastomeric O-ring seal 28. The sleeve 24 includes a cylindrical nose surface 30, and internally, includes the passage 32 concentrically related to the body passage 14. The passage 32 includes the annular recess 34 for receiving the O-ring seal 36 whereby a sealing interconnection with the male adapter 11 is achieved as appreciated from FIG. 1.

Three arcuate slots 38 are defined through the wall of the sleeve 24, and the slots 38 are of slightly less axial dimension adjacent the passage 32 than exists at the nose surface 30 whereby the detents 40 located within the slots 38 will not inwardly fall into the passage 32. The detents 40 constitute arcs which may be radially positioned upon the sleeve 24 by the locking sleeve 42, as later described. It will also be appreciated that the inventive concepts of the invention may be practiced wherein the detents 40 constitute cylindrical balls, rather than arcs, and the particular configuration of the detents 40 is not critical to the practice of the invention.

Operation of the detents 40 is achieved through the annular locking sleeve 42 which circumscribes the adapter receiving sleeve 24. The locking sleeve 42 includes a cylindrical internal retaining surface 44 directly engaging the nose surface 30, and a conical cam surface 46 intersects the surface 44 adjacent the outer end of the locking sleeve. A compression spring 48 circumscribing nose surface 30 is interposed between the sleeve shoulder 50 and the locking sleeve shoulder 52 whereby the spring 48 will bias the locking sleeve 42 toward the right as viewed in FIGS. 1–3. Axial movement of the locking sleeve 42 on the sleeve 24 is limited by engagement of the cam surface 46 with the spring clip 54 located within a groove formed in the nose surface 30 adjacent the outer end of the adapter receiving sleeve 24.

The locking sleeve 42 is provided with an inner end surface 56 disposed toward the coupling part body 12, and as later described the locking sleeve's end surface 56 constitutes a significant aspect of the inventive concepts.

Internally, the body passage 14 is provided with a ball valve 58 rotatably mounted therein. The ball valve 58 includes a spherical outer surface 60 and includes a cylindrical diametrically related bore 62 having a diameter only slightly less than the diameter of the body passage 14 so as to minimize fluid flow pressure loss and maximize flow capacity as fluid flows through the ball valve bore 62. An elastomeric seal 64 mounted on the adapter receiving sleeve 24 engages the valve surface 60 to render the relationship between the valve and the sleeve 24 fluid tight.

The ball valve 58 is rotatably mounted within the passage 14 by a pair of journals or shafts rotatably received within diametrically related and coaxially aligned holes in the body 12. The longer shaft 66 and the shorter shaft 68 each include ends having flats defined thereon, FIG. 6, for being received within the slots 70 formed on opposite sides of the ball valve 58. The shafts 66 and 68 are rotatably received within the coaxially aligned body bores 72 and by use of the screws 74 and 76 the shafts 66 and 68, respectively, are attached to the ball valve.

An elongated handle 78 is mounted upon the shaft 66 as the shaft 66 is received within the handle hole 80 in a non-rotative manner. The handle 78 includes a longer end 82 upon which the keeper 84 is pivotally mounted upon pivot 86, and the keeper is biased in a counter-clockwise direction, FIG. 2, by the spring leaf 88. A projection 90 is defined upon the keeper 84 for positioning the handle 78 as desired, as later explained.

Figure 5:
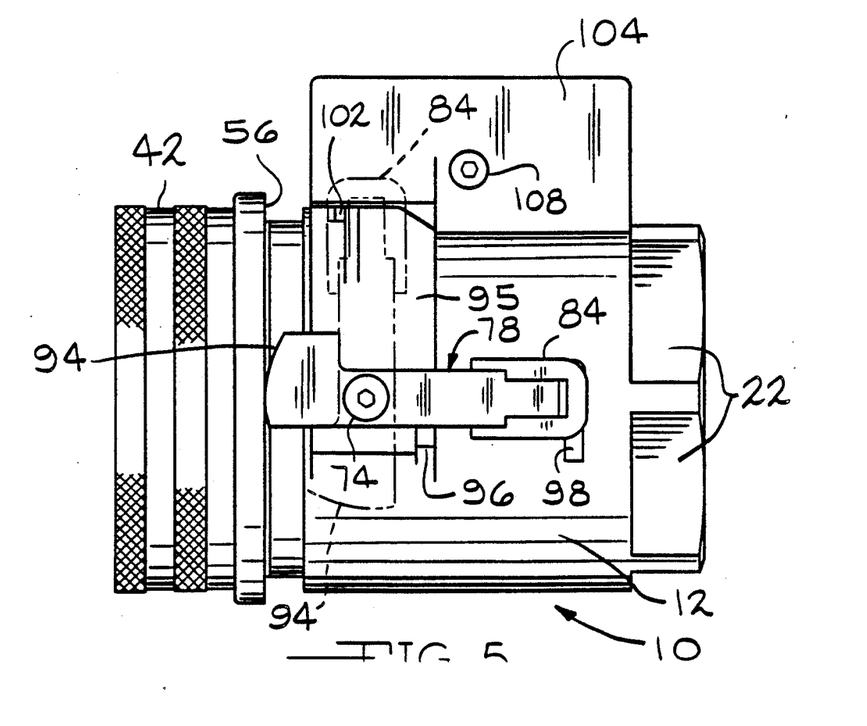
FIG. 5 is an exterior plan view of the coupling as taken from the top of FIG. 2, the valve operating handle being shown in the closed condition in dotted lines.

The shorter end 92 of the handle 78 includes an abutment surface 94 which is of a generally convex configuration, FIG. 5, generally concentric to the pivot axis of the ball valve 58 as defined by the shafts 66 and 68. The abutment surface 94 extends radially inwardly and is in axial alignment with the inner end 56 of the locking sleeve 42 to permit engagement therebetween as will be appreciated from FIG. 2 when the ball valve 58 is in the open position shown in FIG. 2.

A boss 95 is defined upon the exterior of the body 12 and a stop 96 extends therefrom for engagement with the handle portion 82 when the handle 78 is in the valve open position of FIG. 5. The body 12 is exteriorly provided with a notch 98, FIG. 6, which receives the keeper projection 90, FIG. 20, when the handle 78 is in the valve open position.

Figure 6:
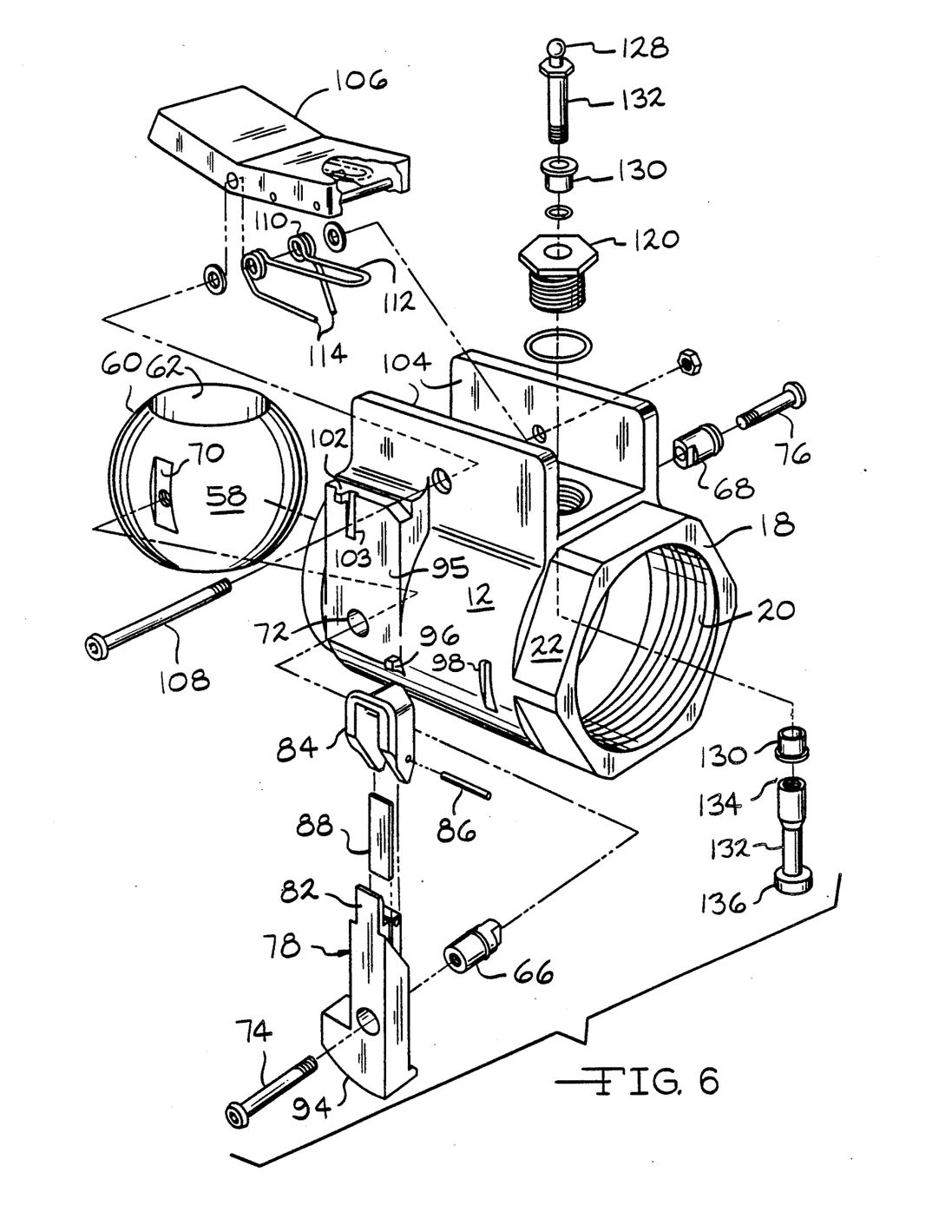
FIG. 6 is an exploded perspective view of the conduit body and the valve, valve operating handle, and switch components.

The boss 95 also includes a stop 102 against which the handle portion 82 engages when the handle 78 is rotated to the valve closed position, and when the handle is engaging the stop 102 the projection 90 is received within the boss notch 103, FIG. 6.

Figure 7:
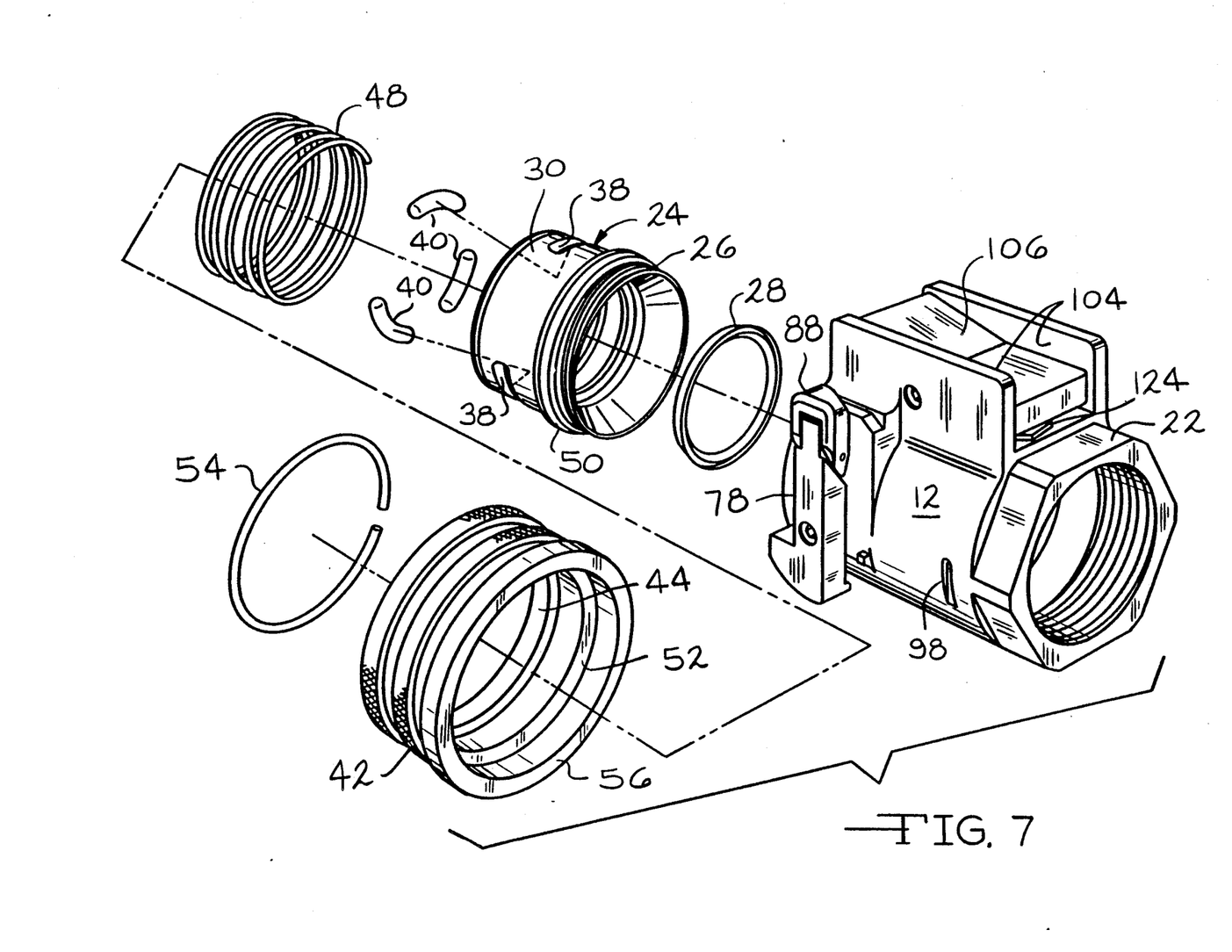
FIG. 7 is an exploded perspective view of the coupling body illustrating the locking sleeve, adapter receiving sleeve and locking sleeve structure.
Figure 8:
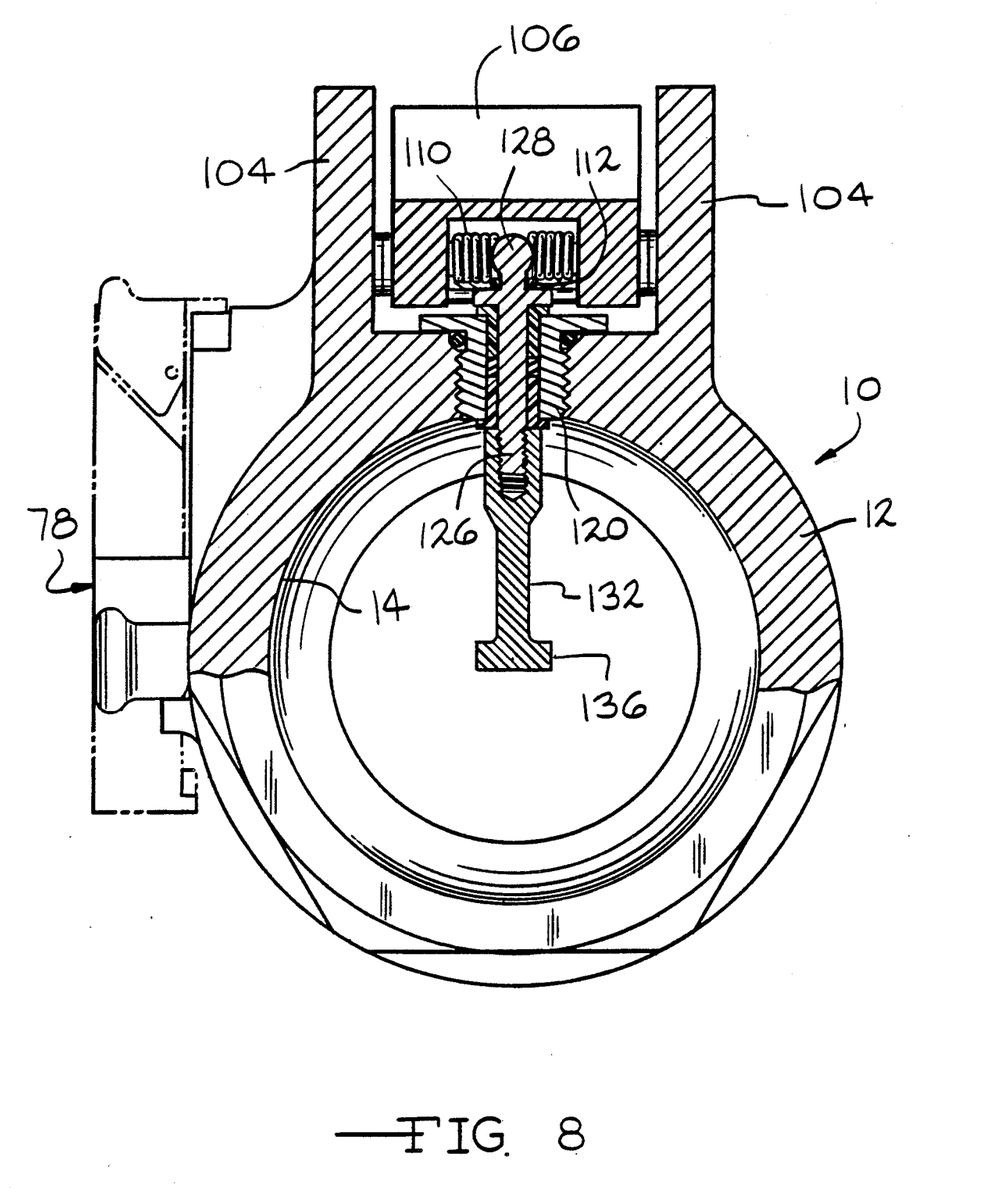
FIG. 8 is an elevational partly sectional view as taken through the switch contact along Section 8—8 of FIG. 1.

A pair of flange extensions 104 are homogeneously defined upon the exterior of the body 12 as best appreciated from FIGS. 6 and 7. The extensions 104 are parallel and spaced with respect to each other and the pivoted switch handle 106 is located therebetween. The switch handle 106 is of the large rocker type including obliquely related portions disposed on opposite sides of the pivot rod 108 which is mounted within holes located in the extensions 104.

A spring 110, FIG. 6, includes coils extending about the pivot rod 108, and the U-shaped spring end 112 engages constitutes a switch contact located on the underside of the switch handle 106 and the spring ends 114 bear upon a body insert in electrical connection to the body 12.

As best illustrated in FIG. 1, a threaded insert 120 is radially located within the body.12 within the threaded bore 122, and the insert 120 includes a bore 124 in which the electrical conducting stud 126 is mounted. The stud 126 includes a spherical head 128 which extends upwardly toward the switch handle 106, and the stud 126 is electrically insulated from the insert 120 by the two dielectric insulation sleeves 130. The stud extension 132 is threaded at 134 to the inner end of the stud 126 is also electrically isolated from the body 12 and includes the head 136.

The head 136 is adapted to be engaged by a contact 138 mounted in the hose fitting associated with the hose electrical conductor wire 140, FIG. 1, whereby upon threading the hose fitting, represented in phantom lines at 142, into the threads 20 an electrical connection is made between the extension head 136 and the hose fitting contact 138 and conductor 140.

When the coupling 10 is mounted upon the hose fitting 142 the valve handle 78 will, of course, be in the closed dotted line position shown in FIG. 5. In this position the handle abutment surface 94 will be swung clear of the locking sleeve 42, the keeper projection 90 will be engaging the boss notch 103, and usually, the switch handle 106 will be pivoted in the clockwise direction, FIG. 1, whereby the spring contact 112 will not be in engagement with the stud head 128. The spring 48 will have biased the locking sleeve 42 toward the right, FIG. 3, wherein the locking sleeve retaining surface 44 will be in radial alignment with the detents 40.

In order to permit the male adapter 11 to be inserted into the adapter receiving sleeve passage 32 the locking sleeve 42 will be axially displaced to the left removing the detents from radial alignment with the surface 44 and the cam surface 46. Thereupon, the male adapter 11 may be inserted into the passage 32 and the nose of the male adapter will radially move the detents 40 outwardly so that the adapter may be fully located within the passage 32 such that the adapter annular groove 144 will be aligned with the detents 40. Thus, upon release of the locking sleeve 44 to permit spring 48 to bias the sleeve 42 to the right, FIG. 1, the cam surface 46 will engage the detents 40 forcing the detents into the male adapter groove 144, and thereafter the locking sleeve retaining surface 44 will be radially disposed over the detents 40 maintaining the detents in a positive locking relationship with the adapter groove 144 interconnecting the coupling part 10 to the male adapter 11 in the known manner.

Figure 2:
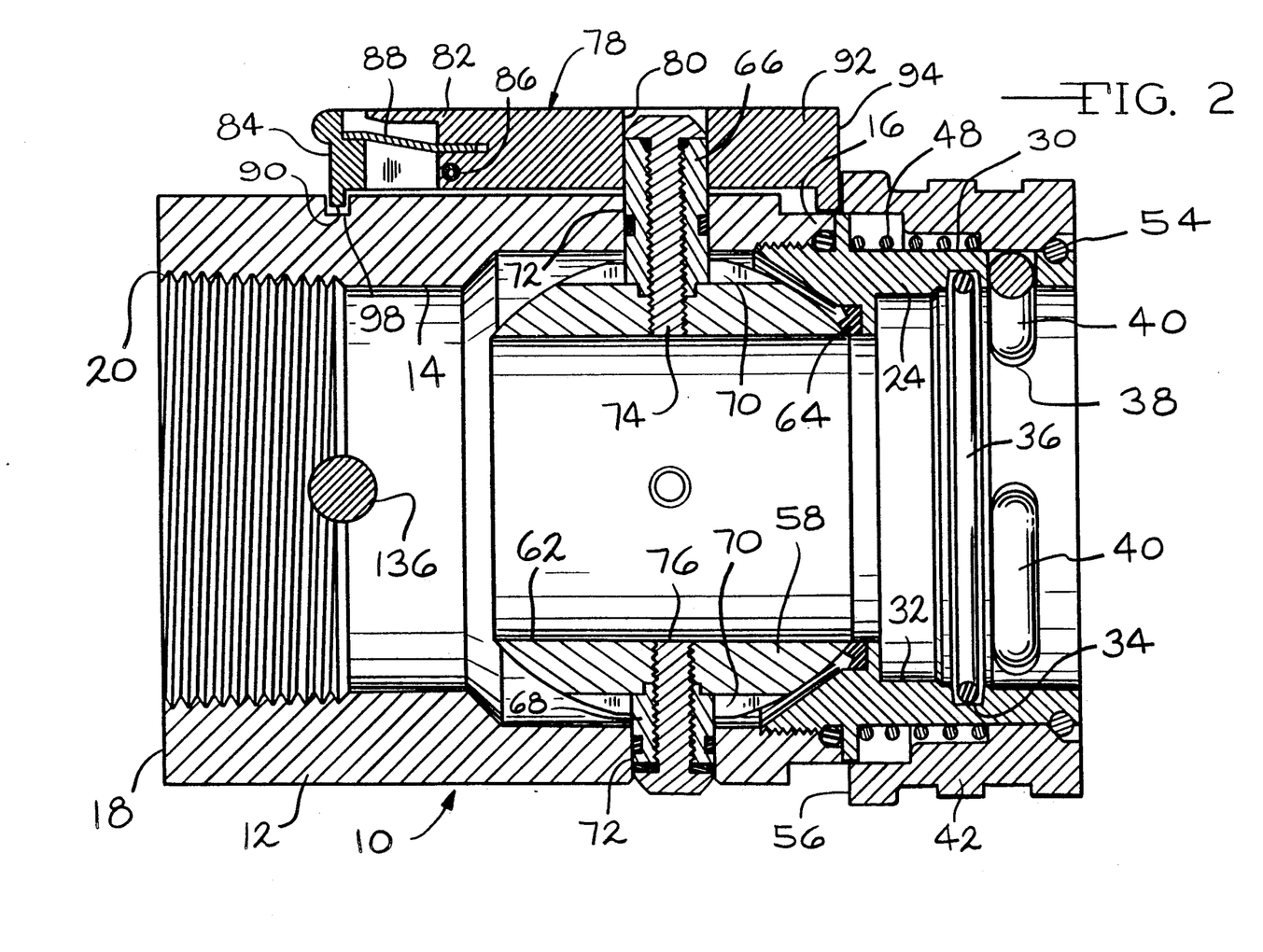
FIG. 2 is an elevational diametrical sectional view taken along Section 2—2 of FIG. 1 illustrating the valve handle keeper in the closed condition and the valve in the open position, and the locking sleeve being shown in the detent retaining position.
Figure 3:
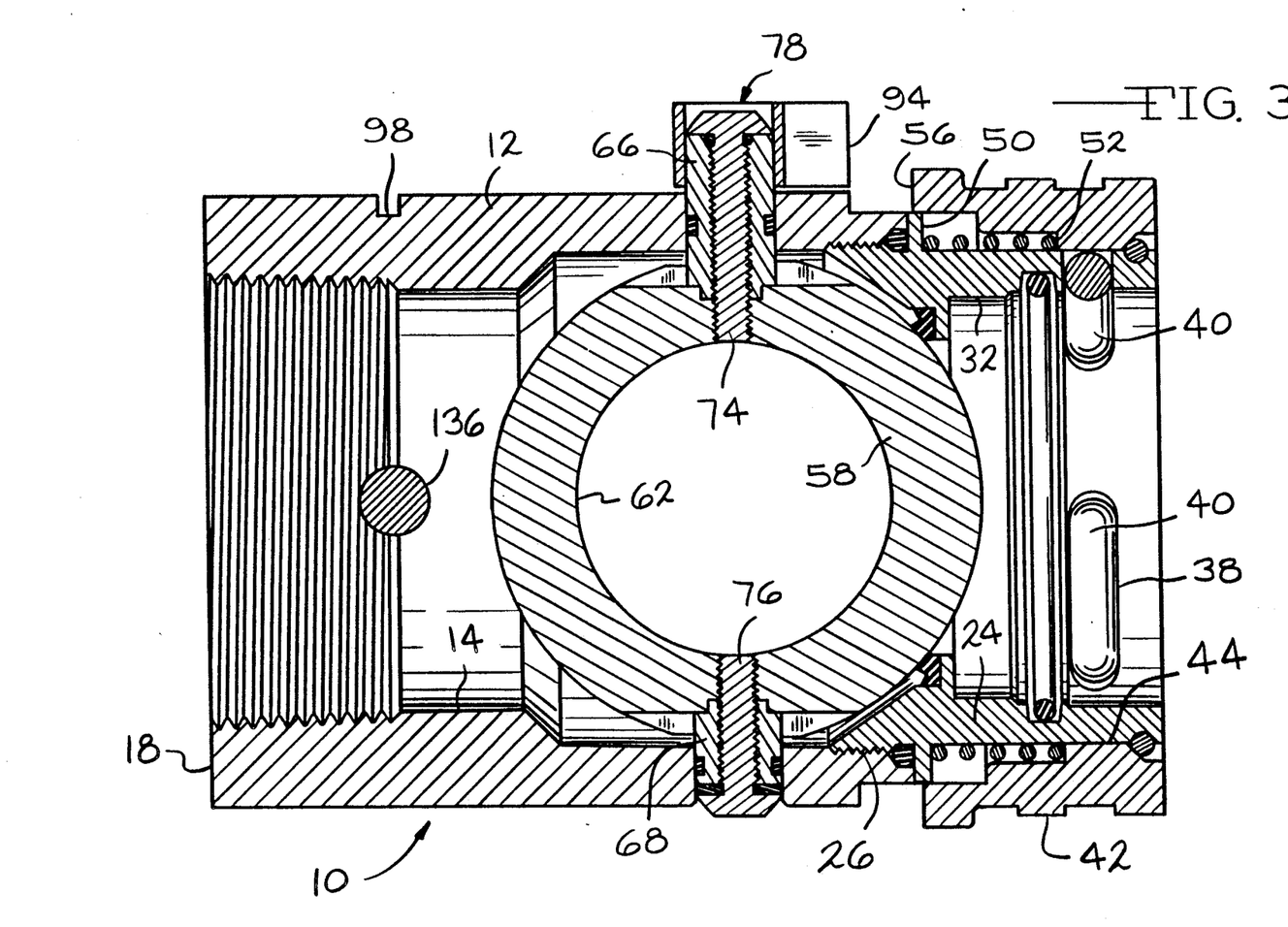
FIG. 3 is a diametrical elevational view similar to FIG. 2 illustrating the ball valve in the closed position.
Figure 4:
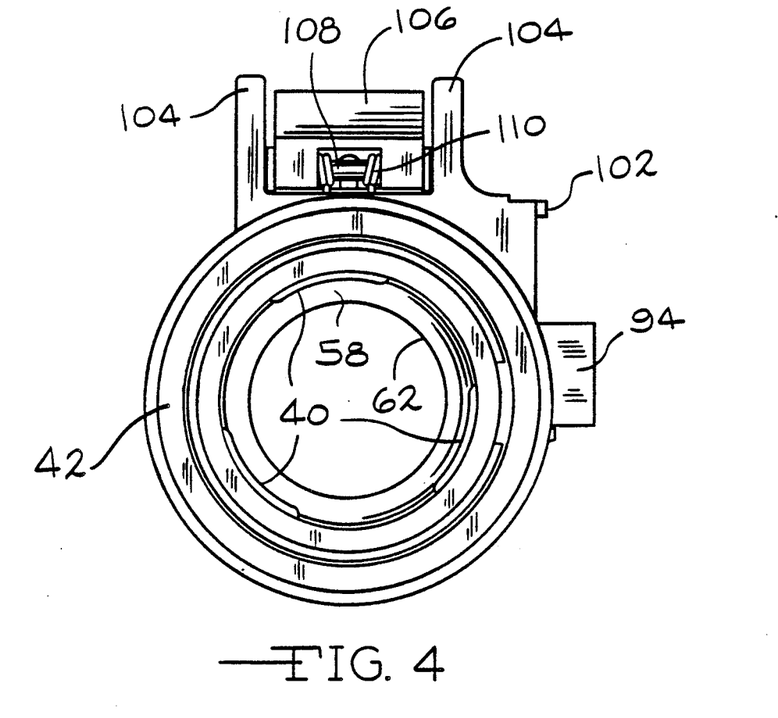
FIG. 4 is an end elevational view of the conduit part as taken from the right of FIG. 1.

It will be appreciated that when the locking sleeve 42 is displaced to the left, FIG. 2, during the interconnection of the coupling part 10 and the adapter 11, during this displacement of the locking sleeve the ball valve handle 78 cannot be rotated in a clockwise, FIG. 5, direction to open the valve as the abutment surface 94 would engage the locking sleeve inner end 56. However, after the locking sleeve 42 has returned to the locking condition shown in FIGS. 1-3 the ball valve handle 78 can be rotated in the clockwise direction, FIG. 5, to open the ball valve 58 to permit full flow through the coupling part 10 and the adapter 11. Of course, to permit this clockwise rotation of the handle 78 the keeper 84 must be lifted against the biasing force of the leaf spring 88 to remove the projection 90 from the notch 103. When the handle 78 is in the full open position the keeper projection 90 will engage the notch 98 to insure maintaining of the valve in the open position.

With the valve handle 78 in the open position as shown in FIGS. 2 and 5 the handle abutment surface 94 is in axial alignment with the locking sleeve inner end 56 and the locking sleeve 42 cannot be displaced axially to the adapter release position preventing inadvertent release of the coupling part 10 and the adapter 11 while the valve 58 is in the open position. It is to be noted that the abutment surface 94 has a significant circumferential dimension whereby movement of the locking sleeve in the release direction is prevented until the handle 78 has fully closed the valve 58, and the configuration of the valve handle end 92 is such that interference occurs with the locking sleeve until the valve handle has fully closed the valve.

Once the valve handle 78 has been rotated in the counterclockwise direction to the dotted line closed position, FIG. 5, the locking sleeve 42 may be displaced inwardly sufficiently to release the detents 40 and permit the adapter 11 to be removed from the adapter receiving sleeve 24.

The location of the switch structure upon the body 12 permits the pump supplying pressurized fluid to the coupling part 10 to be remotely energized once the interconnection between coupling part 10 and adapter 11 has been achieved. Depressing of the handle 106 will force the spring end contact 112 over the stud head 128 and the interrelationship between the head 128 and contact 112 will maintain the switch handle 106 in the "on" condition. In this relationship of the switch components electrical interconnection between the extension 132 and the body 112 is achieved as the spring ends 114 electrically engage the insert 120, and this shorting of the circuit through conductor 140 is sensed by the circuitry, not shown, associated with the pump, not shown, providing fluid to the coupling part 10. This type of pump operation is known in the art, however, the construction of the switch components provides highly dependable operation, and the location of the large switch handle 106 between the extensions 104 prevents inadvertent operation of the handle 106, yet the configuration of the switch handle permits the switch to be pivoted by a gloved operator, which is highly desirable under low temperature conditions of use.

It will be appreciated that the use of the ball valve 58 permits the coupling part 10 and adapter 11 to be disconnected with a minimum loss of fluid from the coupling 10, and the use of the interlock between the valve handle and the operation of the locking sleeve 42 further minimizes the likelihood of accidental spills of fuel or toxic fluids.

It is appreciated that various modifications to the inventive concepts may be apparent to those skilled in the art without departing from the spirit and scope of the invention.

We claim:

1. A fluid coupling comprising, in combination, a body having an axis, a hose connection end, a coupling connection end, a passage connecting said ends and releasable coupling retaining means adjacent said coupling connection end, said body having an exterior surface, an electric switch handle pivotally mounted upon said body exterior surface selectively pivotal between open and closed positions, an electric terminal mounted upon said body adjacent said switch handle, said terminal including an enlarged conductive head, a spring contact mounted on said switch handle adapted to snap over said terminal head and remain in contact therewith at said closed position, a first conductor electrically connecting said contact to said body, and a second conductor connected to said terminal.

2. In a fluid coupling as in claim 1, said second conductor comprising a stud electrically insulated from said body and extending into said body passage.

3. In a fluid coupling as in claim 1, a pair of spaced spring contacts mounted on said handle, said contacts engaging said head on opposite sides thereof maintaining said handle in said closed position.

4. In a fluid coupling as in claim 1, a spring interposed between said handle and said body biasing said handle toward said open position, said spring being electrically connected to said contact and said body and comprising said first conductor.

5. In a fluid coupling as in claim 1, switch handle protective means defined on said body exterior surface located adjacent said handle and extending therebeyond to protect said handle against inadvertent manual displacement between said open and closed positions.

6. In a fluid coupling as in claim 5, said handle protective means comprising a pair of spaced, parallel extensions defined on said body exterior surface, said handle being located between said extensions.

* * * * *